United States Patent [19]

Boireau et al.

[11] Patent Number: 4,924,127
[45] Date of Patent: May 8, 1990

[54] RETAINING MEANS FOR AN ELECTRIC MOTOR SHAFT

[75] Inventors: Christian Boireau, Guyancourt; Patrick Larseneur, Courbevoie, both of France

[73] Assignee: Valeo, Paris, France

[21] Appl. No.: 338,203

[22] Filed: Apr. 14, 1989

[30] Foreign Application Priority Data

Apr. 15, 1988 [FR] France ............... 88 04996

[51] Int. Cl.$^5$ ............................................. H02K 5/16
[52] U.S. Cl. ......................................... 310/90; 310/89; 384/209; 384/903
[58] Field of Search .................. 310/90, 89, 51, 91; 384/209, 210, 903

[56] References Cited

U.S. PATENT DOCUMENTS

| 3,364,778 | 1/1968 | Griffen ................... 384/210 |
| 3,624,434 | 11/1971 | Dafler et al. . |
| 3,754,802 | 8/1973 | Keller . |
| 4,711,590 | 12/1987 | Lakin .................... 310/90 |
| 4,777,395 | 10/1988 | Taylor ................... 384/209 |

FOREIGN PATENT DOCUMENTS

| 1078378 | 3/1960 | Fed. Rep. of Germany . |
| 2212186 | 9/1973 | Fed. Rep. of Germany . |
| 2416878 | 10/1975 | Fed. Rep. of Germany ........ 310/90 |
| 2406332 | 5/1979 | France . |
| 2588628 | 4/1987 | France . |
| 0041812 | 3/1977 | Japan ..................... 310/90 |
| 0189149 | 8/1986 | Japan ..................... 310/90 |

Primary Examiner—R. Skudy
Attorney, Agent, or Firm—Dennison, Meserole, Pollack & Scheiner

[57] ABSTRACT

The invention is concerned with a retaining arrangement for a bearing of an electric motor, the retaining arrangement comprising a resilient element and a bell ring.

The resilient element comprises a securing ring having a peripheral anchor rim portion which, in transverse cross section, has two branches, namely an outer branch and an inner branch. The outer branch carries anchoring arrangement, while the inner branch is interrupted by slots and carries securing fingers at an axial distance from the zone in which the two branches are joined.

The invention is applicable to an electric motor for a heating system.

8 Claims, 2 Drawing Sheets

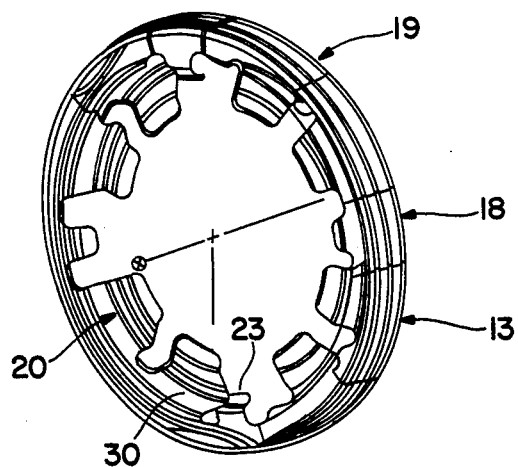
FIG. 4
FIG. 6
FIG. 5
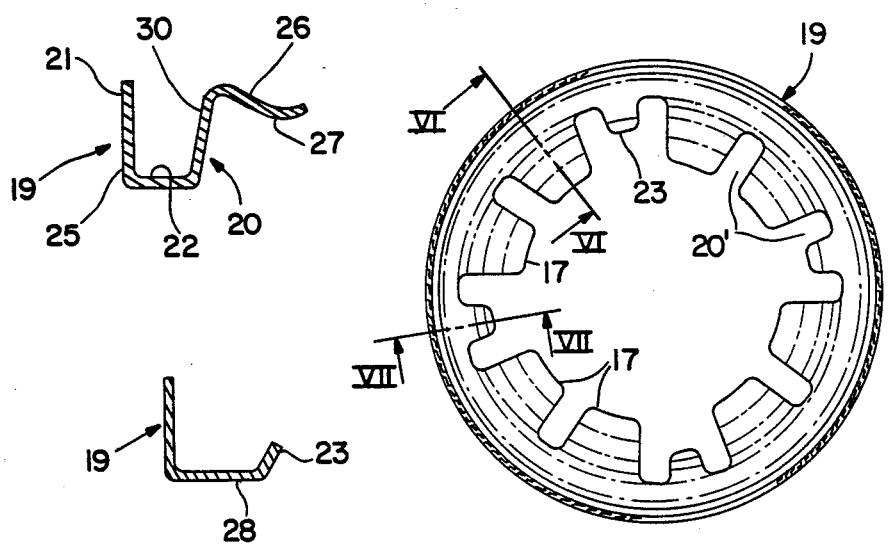
FIG. 7

RETAINING MEANS FOR AN ELECTRIC MOTOR SHAFT

FIELD OF THE INVENTION

This invention relates to the retaining means of an electric motor having an end plate comprising a retainer housing means and further having a rotor shaft and a bearing associated with said rotor shaft, and the said retaining means, the latter being adapted for retaining said shaft bearing by trapping the latter between the end plate and the retaining means, with the retaining means fitted in the retainer housing means. The invention also relates to a method of mounting the retaining means in the said end plate.

BACKGROUND OF THE INVENTION

One such arrangement is described in the French published patent application No. 2 406 332, which describes an embodiment in which the retaining means comprises a resilient ring of toothed form, together with a bell ring having a pressed portion profiled to conform with the contours of the bearing. The outer periphery of the resilient ring is mounted in a recess formed in the motor end plate, while its inner periphery, defined by securing fingers, is adapted to cooperate with a generally radial flange of the bell ring, so as to retain the bearing in place.

Such an arrangement is not entirely satisfactory, partly because its does not permit sufficiently close control of the forces exerted on the bell ring, and partly because it complicates the assembly process. The forces on the bell ring are variable, partly due to the presence of the recess, and partly due to manufacturing tolerances.

SUMMARY OF THE INVENTION

An object of the present invention is to overcome these disadvantages, and accordingly to provide an arrangement in which the retaining means permits close control of the force exerted on the bell ring while facilitating assembly, and also leads to the other advantages.

According to the invention, in a retaining means of the kind described above under "Field of the Invention", and comprising a resilient element and a bell ring, the resilient element comprises a securing ring having a peripheral anchor rim portion defining, in transverse cross-section, an outer branch and an inner branch thereof, and further comprises anchor means carried by the outer branch and a junction zone joining the said branches together, the inner branch being interrupted by slots and comprising securing fingers carried by the inner branch at an axial distance from said junction zone.

The invention leads to simplification both of the assembly process and of the shape of the housing portion of the end plate, which can be a simple, open, annular recess. It will be appreciated that the securing fingers, together with the inner branch of the securing ring, form resilient hooks.

It will also be noted that the geometry of the seating which is provided in the end plate to accommodate the bearing is not influenced by the retaining means according to the invention, as would be the case for example where the bearing was set between the end plate and the securing ring.

In addition, the bearing is not immobilised unduly, so that the bearing torque which opposes rotational movement of the bearing about its centre point is as small as possible and constant. This allows any errors in alignment of the two bearings supporting the motor shaft to be compensated for.

The bearing is thus enabled to tilt under the bell ring, which is a better arrangement than that obtained where the securing ring and bell ring are integral with each other in a single member. It will be appreciated that the above mentioned hooks maintain the bell ring in its correct alignment, with the flange lying in a generally radial plane.

Furthermore, the force exerted on the bearing can be predetermined with some accuracy, as a function of the axial distance existing between the junction zone joining the two branches of the securing ring on the one hand, and the securing fingers on the other. This accuracy is enhanced even further by inclining the inner branch of the securing ring inwardly towards the bearing axis.

According to another feature of the invention, either the securing fingers or the generally radial flange of the bell ring have a rounded, force-applying portion.

Preferably, the securing ring is thinner than the bell ring, the above mentioned force-applying portion being formed on the securing fingers. This enables circular contact over a narrow zone to be obtained between the securing fingers and the bell ring. This contact contributes to the further diminution of the bearing torque, by reducing the extent of the friction surface and by allowing the bell ring, and therefore the bearing, to centre themselves.

The anchor rim portion may have a transverse cross-section in the form of a "V", but preferably it is U-shaped.

With this arrangement, good positioning of the securing ring, by virtue of contact between the outer branch of the latter and the housing portion of the motor end plate, is made possible. This is hardly influenced at all by the inner branch being subjected to the force exerted by the securing fingers.

In another feature of the invention, the branches of the anchor rim portion of U-shaped cross section are divergent towards their free ends. This enables substantial elasticity to be obtained in the branches, and this in turn improves the anchorage of the securing means and bearing in the motor end plate and assists deformation of the securing fingers.

Pre-assembly tabs are preferably provided in the region of the said junction zone joining the two branches of the securing ring.

In order to facilitate the assembly process, it is only necessary to provide the bell ring and the resilient element as a unit. This is done before assembly of the securing means and bearing with the motor end plate, by trapping the bell ring between the securing fingers and the pre-assembly tabs. The latter are made so that they will deform for this purpose. Then, following the method of assembly of the present invention, after the bearing has been put in place, the sub-assembly thus formed can be fitted in the housing formed in the motor end plate by engaging the sub-assembly on the bearing, using a suitable tool applied in the junction zone between the two branches of the anchor rim portion, so as to force the pre-assembly tabs further away (in the axial direction) from the securing fingers, until the securing ring comes into abutting engagement against the base of the housing recess.

It will be appreciated that the pre-assembly tabs can serve to locate a felt cushion ring surrounding the bearing, particularly for the purpose of lubricating the latter. The pre-assembly tabs thus have two functions.

Preferably, the base of the anchor rim portion of U-shaped cross-section is flat, so that manufacture of the pre-assembly tabs is facilitated, and so that the seating surface for the securing ring on the base of the housing recess is increased, as is the surface of the securing ring available for engagement by the above-mentioned tool. Preferably, the pre-assembly tabs project from the base of the U-shaped cross-ection. The inner branch can thus deform resiliently without having any significant effect on the pre-assembly tabs.

According to a further feature of the invention, the pre-assembly tabs are arranged alternately with the securing fingers, considered circumferentially. This leads to good distribution of the material.

The pre-assembly tabs are preferably inclined, being directed towards the securing fingers with their free ends disposed generally on a circumference of the same diameter as the rounded force-applying portions of the securing fingers. This enables the bell ring to be securely gripped before assembly.

The description which follows illustrates the invention in greater detail, by way of example only, with reference to the accompanying drawings.

BRIEF DESCRIPTION OF THE DRAWINGS

FIG. 4 is a perspective view of the securing ring of the retaining means according to the invention.

FIG. 5 is a view of the same securing ring in elevation.

FIG. 6 is a view taken on the line VI—VI in FIG. 5.

FIG. 7 is a view taken on the line VII—VII in FIG. 5.

DESCRIPTION OF PREFERRED EMBODIMENT

Figure 1:
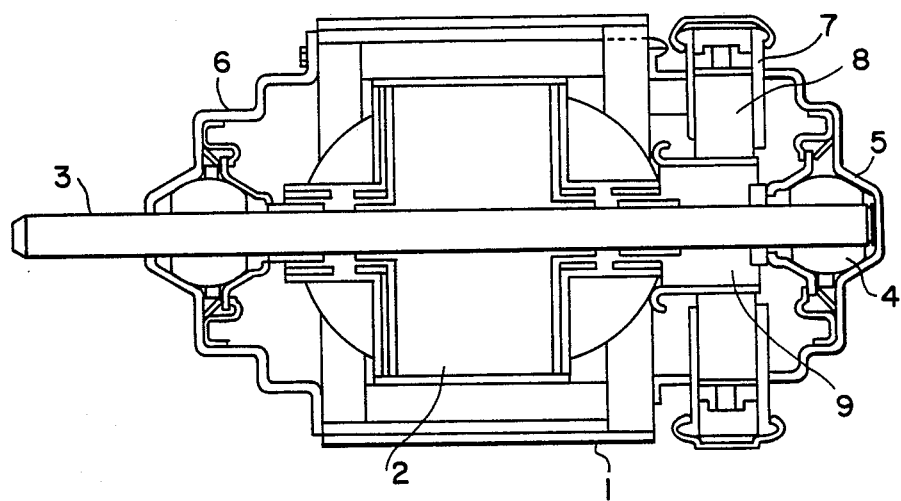
FIG. 1 is a view of the electric motor in axial cross section.

FIG. 1 shows the inductor or stator of the electric motor, which in this example is of a kind suitable for use in a heating installation for an automotive vehicle.

A rotor 2 is located within the stator 1, with its winding mounted on a rotor shaft 3 carried by bearings 4, each of which is mounted in a bearing carrier or motor end plate 5, 6 respectively. The motor also has a brush carrying plate 7, carbon brushes 8, and a commutator 9.

The end plates 5 and 6 are substantially identical to each other, in that each has a seating portion 10 for the corresponding bearing 4, and a retainer housing portion 11 in which a retaining means 12 is mounted. In this example the retainer housing portion 11 is an open cylindrical recess formed in the end plate.

The purpose of the retaining means 12 is to retain the bearing 4 by trapping it between the seating portion 10 and the retaining means 12 itself, when the latter is fitted tightly in the retainer housing portion 11. The retaining means comprises a securing ring 13 and a bell ring 14 which is formed with a profiled portion 15. The profiled portion 15 co-operates with the seating portion 10, and both of these portions 10 and 15 are profiled so as to conform with the outer contour of the bearing 4.

The bell ring 14 also has a radial flange 16, which is urged by a set of securing fingers 17 of the securing ring 13 in a direction towards the seating portion 10.

Figure 2:
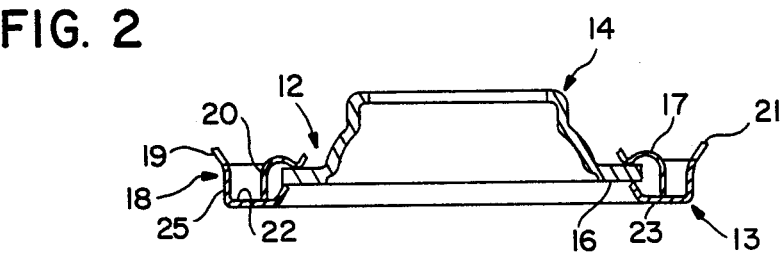
FIG. 2 is a view showing the retaining means according to the invention, pre-assembled to form a sub-assembly.

In accordance with the invention, the securing ring 13 is in the form of a resilient element having an anchor rim portion 18. The anchor rim portion 18 has two branches 19 and 20, as seen in transverse cross section in FIGS. 6 and 7. The outer branch 19, which is radially outward of the branch 20, carries anchoring means 21 which are best seen in FIG. 2. The inner branch 20 is interrupted by slots 20'. FIG. 5 (which in this example have a width greater than zero), and carries the securing fingers 17. The fingers 17 extend radially inwardly from a central portion 22 which joins the two branches 19 and 20. The securing fingers 17, together with the associated parts of the inner branch 20, thus form hooks indicated at 30 in FIGS. 3, 4 and 6. Pre-assembly tabs 23 are provided in the vicinity of the central portion 22 of the anchor rim 18 portion.

In the particular example shown, the anchor rim portion 18 has a transverse cross section in the form of a "U", comprising its outer branch 19, inner branch 20, and central portion 22. The base of central portion 22 being flat it is adapted to abut against a radially extending bottom portion 24 of the retainer housing portion 11. The outer branch 19 of the anchor rim portion 18 includes a cylindrical portion 25 which terminates in a projecting lip, flared outwardly with respect to the axis of the motor and constituting the anchoring means 21 mentioned above in connection with FIG. 2.

The outer diameter of the cylindrical portion 25 is substantially equal to the inner diameter of the retainer housing portion 11, while the outer diameter of the inclined anchoring means 21 is slightly greater than the inner diameter of the portion 11.

The shape of the securing ring 13 and the direction in which the sheet material from which it is made is pressed, are chosen in such a way as to facilitate the anchoring of the securing ring 13 in the retainer housing portion 11 in which it is to be positioned.

The inner branch 20 of the anchor rim portion 18 is inclined towards the axis of the motor, so that the outer ends of the branches 19 and 20 are divergent away from the central portion 22. In this embodiment, the inclination of the branch 20 is continuous, with the securing fingers 17 being carried at its outer edge. Each finger 17 has an inclined portion 26 joined to the branch 20 and terminating in a rounded portion 27, which acts as the force-applying part of the finger 17. As can be seen in FIG. 6, the inclined portion 26 is bent downwards towards the plane of the central portion 22 of the securing ring.

The pre-assembly tabs 23 project from a radial extension 28, FIG. 7, of the central portion 22, and are inclined inwardly towards the axis of the securing ring 13. The tabs 23 are thus also directed towards the fingers 17. As can be seen in FIG. 5, the tabs 23 are arranged (considered circumferentially) alternately with fingers 17, there being slots between the fingers and tabs interrupting the inner branch 20. In this example, there are two of the securing fingers 17 between each pre-assembly tab 23 and the next tab 23, while the free ends of the tabs 23 are generally situated on a common circumference with the middle part of the rounded portions 27 of the securing fingers 17, it will be noted that the securing fingers 17 are wider in the circumferential direction than the pre-assembly tabs 23, the latter being shorter in the radial direction and also more rigid due to their shape.

As can best be seen from FIG. 2, it is possible to construct a sub-assembly consisting of the bell ring 14 and the securing ring 13. This is made possible by virtue of the pre-assembly tabs 23 and securing fingers 17. In this sub-assembly, the bell ring 14 is retained against movement by being trapped between the tabs 23 and fingers 17: more specifically, the radial flange 16 is gripped between the tabs 23 and fingers 17 before it is mounted in place on the end plate 5 or 6.

It will also be noted that the pre-assembly tabs 23, by virtue of their construction, form a relatively rigid retaining means. Thus, although while being assembled with the bell ring 14, the fingers 17 are able to bend resiliently due to their inwardly directed configuration (by virtue of the inclined portions 26), in the opposite direction they are rigid against any tendency for the two components of the sub-assembly to become separated.

Assembly is carried out as follows. After the bearing has been mounted in its seating portion 10, the bell ring 14 is fitted on to the bearing 4 by exerting a force on the central portion 22 of the securing ring 13, using a suitable tool. At this point a clearance is created between the tabs 23 and fingers 17, such that the bell ring 14 is enabled to centre itself automatically. Movement of the securing ring 13 into the retainer housing portion 11 is then continued until the central portion 22 of the ring 13 comes into engagement with the bottom portion 24 of the retainer housing portion 11.

Figure 3:
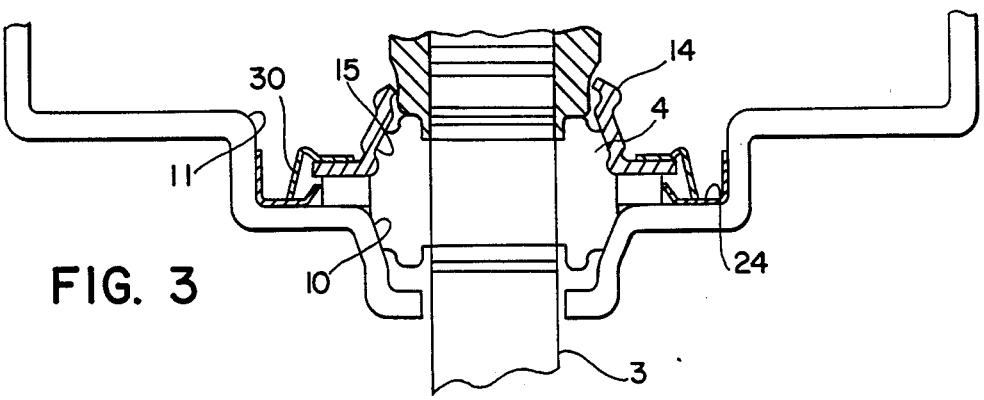
FIG. 3 is a view showing the retaining means after being mounted in the motor end plate.

During this stage of the assembly operation, the securing fingers 17 are raised away from the base of central portion 22, in such a way that the pre-assembly tabs 23 no longer have any effect. This enables the bell ring 14 to slide radially, thereby becoming properly centred. In practice, and as is best seen in FIG. 3, a felt cushion ring 32 is interposed between the radial flange 16 (FIG. 2) of the bell ring 14 and the base of the radially extending bottom portion 24 of the retainer housing portion 11. The ring 32 surrounds the bearing 4 for the purpose of lubricating the latter, and is compressed by the action of the securing fingers 17. It will be noted that, after assembly, the pre-assembly tabs 23 hold the cushion ring 32 in position from outside.

It will be understood from the foregoing description that, during assembly, the anchoring means 21 tends to become deformed in such a way that, after assembly, its intimate engagement with the contours of the retainer housing portion 11 resists any tendency of the securing ring 13 to become dislodged after assembly.

In addition, considering each individual securing finger 17 together with the portion of the inner branch 20 which is associated with it, it will be seen that, due to the length of the branch 20, any parisitic vibrational forces directed towards the axis and acting on the bell ring and bearing are reduced. The bearing 4 is free to tilt under the bell ring 14, which is maintained in proper alignment, with its flange 16 in a radial plane, by the hooks 30.

As will also be gathered from the foregoing, the resilience of the hooks 30 depends on their width and on the width of the inner branch 20. The hooks 30 may be cut in such a way as to increase their resilience if desired.

The invention is of course not limited to the embodiment described above, but embraces all embodiments. For example, each hook 30 may be sub-divided into a plurality of hooks, by means of slits having zero width, and the preassembly tabs 23 may be formed by cutting within the hooks 30 themselves. The securing ring 13 may in certain embodiments be made of plastics material instead of metal.

What is claimed is:

1. In an electric motor having an end plate comprising a retainer housing means and further having a rotor shaft and a bearing associated with said rotor shaft, retaining means for retaining said shaft bearing by trapping the latter between the end plate and the retaining means, with the retaining means fitted in the retainer housing means, said retaining means comprising a resilient element and a bell ring, wherein the resilient element comprises a securing ring having a peripheral anchor rim portion defining, in transverse cross-section, an outer branch and an inner branch thereof, and further comprises anchor means carried by the outer branch and a junction zone joining the said branches together, the inner branch being interrupted by slots and comprising securing fingers carried by the inner branch at an axial distance from said junction zone.

2. Retaining means according to claim 1, wherein the peripheral anchor rim portion is generally U-shaped in transverse cross-section.

3. Retaining means according to claim 2, wherein the said branches of the generally rim portion are divergent towards their free ends.

4. Retaining means according to claim 2, wherein the said junction zone, is flat.

5. In an electric motor having an end plate comprising a retainer housing means and further having a rotor shaft and a bearing associated with said rotor shaft, retaining means for retaining said shaft bearing by trapping the latter between the end plate and the retaining means, with the retaining means fitted in the retainer housing means, said retaining means comprising a resilient element and a bell ring, wherein the resilient element comprises a securing ring having a peripheral anchor rim portion defining, in transverse cross-section, an outer branch and an inner branch thereof, and further comprises anchor means carried by the outer branch and a junction zone joining the said branches together, the inner branch being interrupted by slots and comprising securing fingers carried by the inner branch at an axial distance from said junction zone, wherein the bell ring has a generally radial flange, with a rounded force-applying portion being defined in a member selected from the securing fingers and said radial flange.

6. In an electric motor having an end plate comprising a retainer housing means and further having a rotor shaft and a bearing associated with said rotor shaft, retaining means for retaining said shaft bearing by trapping the latter between the end plate and the retaining means, with the retaining means fitted in the retainer housing means, said retaining means comprising a resilient element and a bell ring, wherein the resilient element comprises a securing ring having a peripheral anchor rim portion defining, in transverse cross-section, an outer branch and an inner branch thereof, and further comprises anchor means carried by the outer branch and a junction zone joining the said branches together, the inner branch being interrupted by slots and comprising securing fingers carried by the inner branch at an axial distance from said junction zone, further comprising a plurality of pre-assembly tabs provided in the securing ring in the region of said junction zone of said branches.

7. In an electric motor having an end plate comprising a retainer housing means and further having a rotor shaft and a bearing associated with said rotor shaft, retaining means for retaining said shaft bearing by trapping the latter between the end plate and the retaining means, with the retaining means fitted in the retainer housing means, said retaining means comprising a resilient element and a bell ring, wherein the resilient element comprises a securing ring having a peripheral anchor rim portion defining, in transverse cross-section, an outer branch and an inner branch thereof, and further comprises anchor means carried by the outer branch and a U-shaped junction zone joining the said branches together, the inner branch being interrupted by slots and comprising securing fingers carried by the inner branch at an axial distance from said junction zone, further comprising a plurality of pre-assembly tabs provided in the securing ring in the region of said junction zone of said branches, and wherein the said pre-assembly tabs project from said U-shaped junction zone, and are inclined towards the securing fingers.

8. In an electric motor having an end plate comprising a retainer housing means and further having a rotor shaft and a bearing associated with said rotor shaft, retaining means for retaining said shaft bearing by trapping the latter between the end plate and the retaining means, with the retaining means fitted in the retainer housing means, said retaining means comprising a resilient element and a bell ring, wherein the resilient element comprises a securing ring having a peripheral anchor rim portion defining, in transverse cross-section, an outer branch and an inner branch thereof, and further comprises anchor means carried by the outer branch and a U-shaped junction zone joining the said branches together, the inner branch being interrupted by slots and comprising securing fingers carried by the inner branch at an axial distance from said junction zone, further comprising a plurality of pre-assembly tabs provided in the securing ring in the region of the said junction zone of said branches, wherein the said pre-assembly tabs project from said U-shaped junction zone, and are inclined towards the securing fingers, and wherein the pre-assembly tabs are disposed alternately in the circumferential direction with the securing fingers.

* * * * *